United States Patent [19]
Hopkins

[11] Patent Number: 5,979,844
[45] Date of Patent: *Nov. 9, 1999

[54] LIQUID BALLASTED SUPPORT BASE

[76] Inventor: Steven Hopkins, P.O. Box 7722, Incline Village, Nev. 89452

[*] Notice: This patent issued on a continued prosecution application filed under 37 CFR 1.53(d), and is subject to the twenty year patent term provisions of 35 U.S.C. 154(a)(2).

[21] Appl. No.: 08/790,927

[22] Filed: Jan. 29, 1997

Related U.S. Application Data

[60] Provisional application No. 60/034,624, Dec. 31, 1996.

[51] Int. Cl.$^6$ .................................................. F16M 13/00
[52] U.S. Cl. ........................ 248/158; 248/529; 248/910; 343/880
[58] Field of Search ..................................... 248/158, 159, 248/910, 529, 523, 524; 343/880, 840, 878

[56] References Cited

U.S. PATENT DOCUMENTS

| | | | |
|---|---|---|---|
| 3,219,301 | 11/1965 | Robinson et al. | 248/188.1 |
| 3,794,279 | 2/1974 | Kramer | 248/44 |
| 3,841,631 | 10/1974 | Dolan | 273/1.5 R |
| 4,145,044 | 3/1979 | Wilson et al. | 273/1.5 R |
| 4,649,675 | 3/1987 | Molclovan et al. | 52/27 |
| 4,759,545 | 7/1988 | Grable | 273/1.5 R |
| 4,922,264 | 5/1990 | Fitzgerald | 343/878 |
| 5,142,293 | 8/1992 | Ross | 343/840 |
| 5,158,281 | 10/1992 | Williams | 273/1.5 R |
| 5,207,407 | 5/1993 | Fitzsimmons | 248/519 |
| 5,259,612 | 11/1993 | Matherne et al. | 273/1.5 R |
| 5,390,914 | 2/1995 | Schroeder | 273/1.5 R |
| 5,452,963 | 9/1995 | Christensen | 404/6 |
| 5,460,353 | 10/1995 | Rittenhouse | 256/1 |
| 5,611,641 | 3/1997 | Christensen | 404/6 |
| 5,632,480 | 5/1997 | Davis et al. | 473/483 |
| 5,730,668 | 3/1998 | Hege et al. | 473/472 |
| 5,760,751 | 6/1998 | Gipson | 343/880 |

*Primary Examiner*—Derek J. Berger
*Assistant Examiner*—Kimberly T. Wood
*Attorney, Agent, or Firm*—Ian F. Burns

[57] ABSTRACT

A ballasted support base is disclosed which may be used to support a large variety of structures and objects. In the preferred embodiment, three equal arc-shaped tanks are fastened together to form a disc-shaped base. When empty, the tanks may be easily transported and they may be stacked to occupy minimum space. When the tanks are fastened together, a flange is used to support a center plate which in turn supports a pole. A plurality of diagonal supports are attached to the pole and the periphery of the base. Each tank comprises a cap for preventing liquid from evaporating and a recess is provided on each tank to allow the tanks to be stacked without interference from the cap. Each tank may also comprise stiffeners for withstanding compressive loads and an adjustment plate may be used to adjust the angular position of the pole.

18 Claims, 8 Drawing Sheets

LIQUID BALLASTED SUPPORT BASE

This application claims priority of provisional patent application Ser. No. 60/034,624, filed on Dec. 31, 1996.

BACKGROUND OF THE INVENTION

1. Field of Invention

The present invention relates to a liquid ballasted support base which is portable and may be used to support a large variety of objects, equipment, and structures.

2. Description of Related Art

Support bases are well known in the art. They have long been used to support many different kinds of objects and structures. For example, support bases are commonly used to support antennas for receiving and transmitting communication signals, sensors for monitoring weather or other conditions, and lights for illuminating a work site.

It is advantageous in many applications to use support bases which are portable and efficiently transported. Support bases are often only needed for a short period of time in one location. For example, a support base maybe used to warn motorists of road construction on a highway. When the road construction is completed, it is necessary to disassemble the support structure and transport it to another site. In this application, it is highly advantageous to have a support base which is easy to assemble and disassemble, may be stored in small spaces, and is easily transported in a vehicle.

It has been found that ballasted support bases are well adapted to be used in application which require portability. Ballast support bases are well known in the art. They are generally designed with a tank which is capable of holding a liquid or sand. The tank rests on the ground and a pole or mast is attached to the tank. The weight of the filled tank maintains the pole in a vertical position. When it is necessary to move the support bases, the tank is emptied.

U.S. Pat. Nos. 3,119,588 to Keats, 3,219,301 to Robinson et al., 3,794,279 to Kramer, 3,841,631 to Dolan, 4,145,044 to Wilson et al., 5,259,612 to Matherne et al., and 5,460,353 to Rittenhouse. Disclose ballasted support bases which may be used to support different kinds of objects. Most of these devices use a single ballast tank to support a pole. However, none of these references disclose a support base which comprises a plurality of mutually supporting ballast tanks which may be disassembled and transported independently. Furthermore, none of these references disclose ballast tanks which may be stacked to occupy minimum space. Although Robinson et al. discloses a support base with three cans, these cans do not provide surfaces which abut each other or are mutually supporting. The cans are merely held against a tube by a paper band. Therefore, the prior art has failed to provide a support base which is stable enough to support a large variety of objects, equipment, and structures, and may be easily and efficiently transported.

SUMMARY OF INVENTION

1. Objects of the Invention

It is an object of the present invention to provide a support base which may be used to support a wide variety of objects and structures.

It is a further object of the present invention to provide a support base which utilizes liquid ballasted tanks.

It is a further object of the present invention to provide a support base which is portable and may be easily assembled.

It is a further object of the present invention to provide a support base which, once assembled, may be easily disassembled and moved.

It is a further object of the present invention to provide a support base which is strong enough to withstand large lateral loads.

It is a further object of the present invention to provide a support base which utilizes liquid ballasted tanks which may be stacked to increase loading capacity and reduce the amount of space required to transport and store the tanks.

It is a further object of the present invention to provide a support base, which when disassembled, is small enough to transport in vehicles and elevators and may be carried up normal stair cases.

It is a further object of the present invention to provide a support base which is inexpensive to manufacturer.

It is the further object of the present invention to provide a support base which utilizes liquid ballasted tanks which have stiffeners so that the tanks may support heavy loads.

It is a further object of the present invention to provide a support bases which has a small vertical surface area and thereby experiences smaller loads from wind resistance.

These and other objects of the present invention will be realized from the following specification, claims, and abstract.

2. Brief Description of the Invention

The base support of the present invention comprises a plurality of ballast tanks which may be easily transported when empty but which provides a heavy base when assembled and filled with liquid or sand. In the preferred embodiment of the present invention the support base comprises three arc-shaped ballast tanks. Each tank forms a 120 degree arc and the three tanks may be fastened together to form a circular disc. Each tank also has a stiffening ridge which engages a stiffening groove of a neighboring tank to provide increased rigidity and stiffness in the vertical walls of each tank. Each tank of the support base engages and supports its neighboring tanks. In alternative embodiments, the liquid ballasted tanks may take different shapes, such as squares, triangles, and rectangles.

When the tanks are fastened together they form a heavy base upon which a large variety of devices and structures may be supported. In the preferred embodiment, a pole is attached to the tanks by a U-bracket and at least one diagonal support. A center plate may be used to provide a base upon which the U-bracket is attached. The center plate is supported by a flange which is an integral part of each ballast tank.

REFERENCE NUMERALS 10 support base
12 arch-shaped tanks
13 cap
14 pole
15 square-shaped tanks
16 diagonal support
17 rhombus tanks
18 U-bracket
19 stiffeners
20 center plate
21 triangular-shaped tanks
22 three-way pipe clamp
23 rectangular-shaped tanks
24 angle brackets
25 tank plates
32 bores
36 flange
38 recess
40 cavity
42 adjustment plate
44 nut
50 ridges
51 tank wall
52 grooves
53 tank wall
54 bolt
56 hole
58 antenna
60 combined support base
62 trusses

DESCRIPTION OF THE PREFERRED EMBODIMENT

Figure 1:
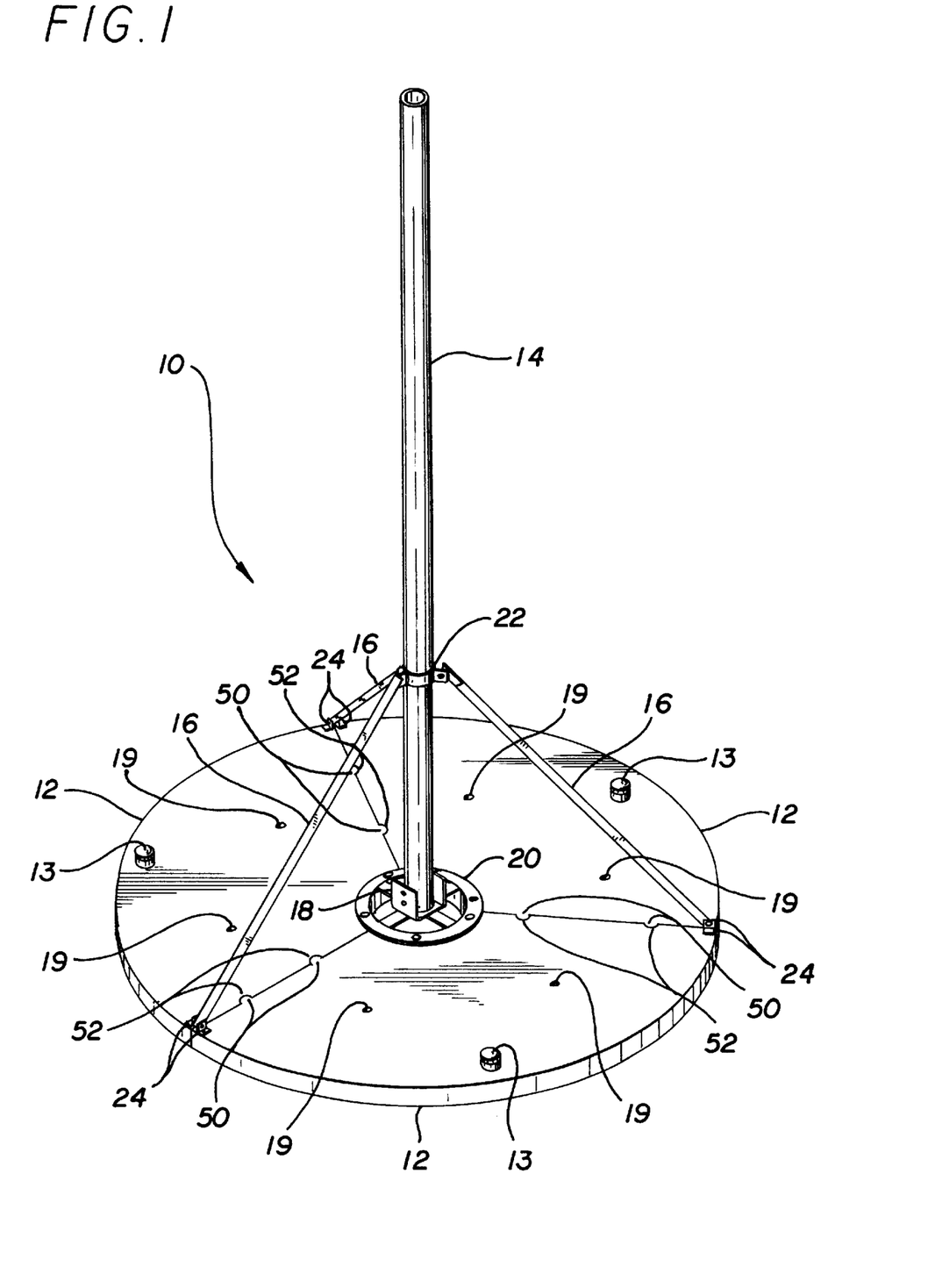
FIG. 1 is a perspective view of a support base of the preferred embodiment of the present invention.
Figure 2:
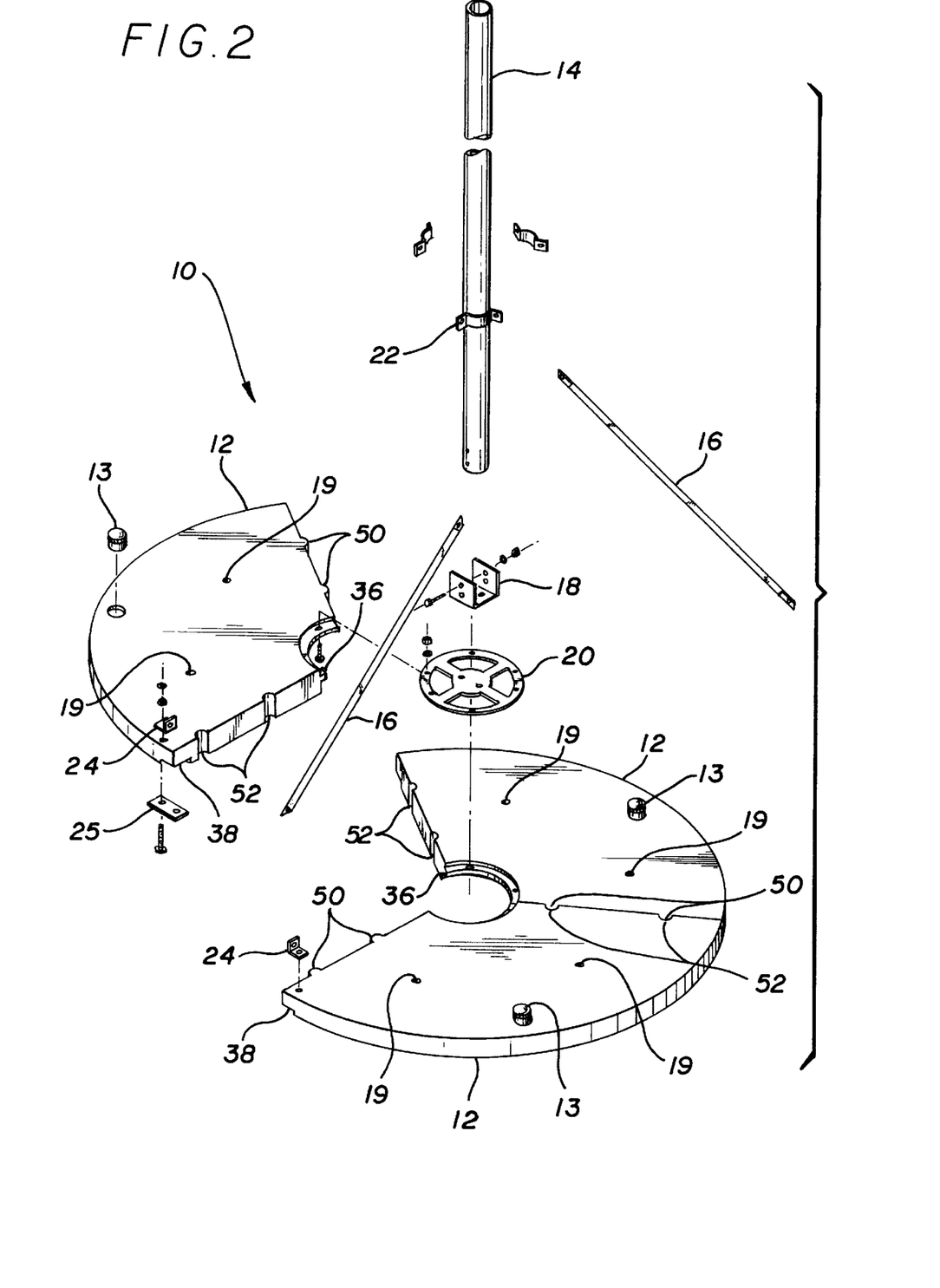
FIG. 2 is an exploded perspective view of the embodiment of the present invention shown in FIG. 1.

As seen in FIGS. 1 and 2, a support base 10 preferably comprises three liquid ballasted tanks 12. Each tank 12 is arc-shaped and forms one-third (⅓) or 120 degrees of a circular disk. When three tanks 12 are combined, a full circular disk is formed. When fastened together, tanks 12 form a tank base. Tanks 12 may be manufactured by blow molding, rotomolding, or in other ways which are well known in the art. In the preferred embodiment, tanks 12 are rotomolded because this method tends to produce uniform wall thicknesses.

Using a number of tanks to form the liquid ballasted base of the invention allows the base to be transported more easily. Although the assembled base may be quite large, the separate tanks may be easily transported in vehicles, carried by people, and moved within a building or other confined area. In the field of antennas, it is often necessary to place an antenna on a roof of a building. In this case, the antenna's support base must be transported to the roof by way of the building's elevators and stair cases. The present invention provides a support base which may be easily transported by workmen using either elevators or stair cases. Once on the roof, tanks 12 may be assembled into a large support base.

Tanks 12 support a pipe, mast, or pole 14. Pole 14 may be used to support a large variety of objects or structures. For example, pole 14 may support antennas, flags, windsocks, sensors, road signs, roofs, fences, clothes lines, canopies, sports nets, and lights. Pole 14 is supported by a U-bracket 18 and diagonal supports 16. Preferably, at least two bolts are used to attach pole 14 to U-bracket 18. Initially, pole 14 can be attached using only one of the two bolts in U-bracket 18. Items can be attached to the top of pole 14 when pole 14 is in a horizontal position or near the ground. Pole 14 can then be pivoted to a vertical position, eliminating the need for a ladder to attach items to the top of pole 14 which may be a significant height above support base 10.

U-bracket 18 is supported by a center plate 20. Center plate 20 serves the dual purpose of supporting U-bracket 18 and securing the tanks together at the center of support base 10. Center plate 20 rests on flange 36 of tanks 12 when the tanks are assembled. Diagonal supports 16 are attached to pole 14 by three-way pipe clamp 22. Tank plates 25 are used to secure each tank 12 to its neighboring tanks. Tank plates 25 have square holes to allow the use of carriage bolts. Carriage bolts eliminate the need to hold the bolt head with a wrench when tightening a nut onto the carriage bolt. However, other types of fastening devices may also be used to fasten tank plates 25 the underside of each tank 12. Recess 38 provides a space for tank plate 25 and also prevents support base 10 from resting on bolts which may damage a roof or cause support base 10 to rest unevenly. Angle brackets 24 serves the dual purpose of securing tanks 12 together and attaching diagonal supports 16 to tanks 12.

Figures 3A, 3B, 3C:
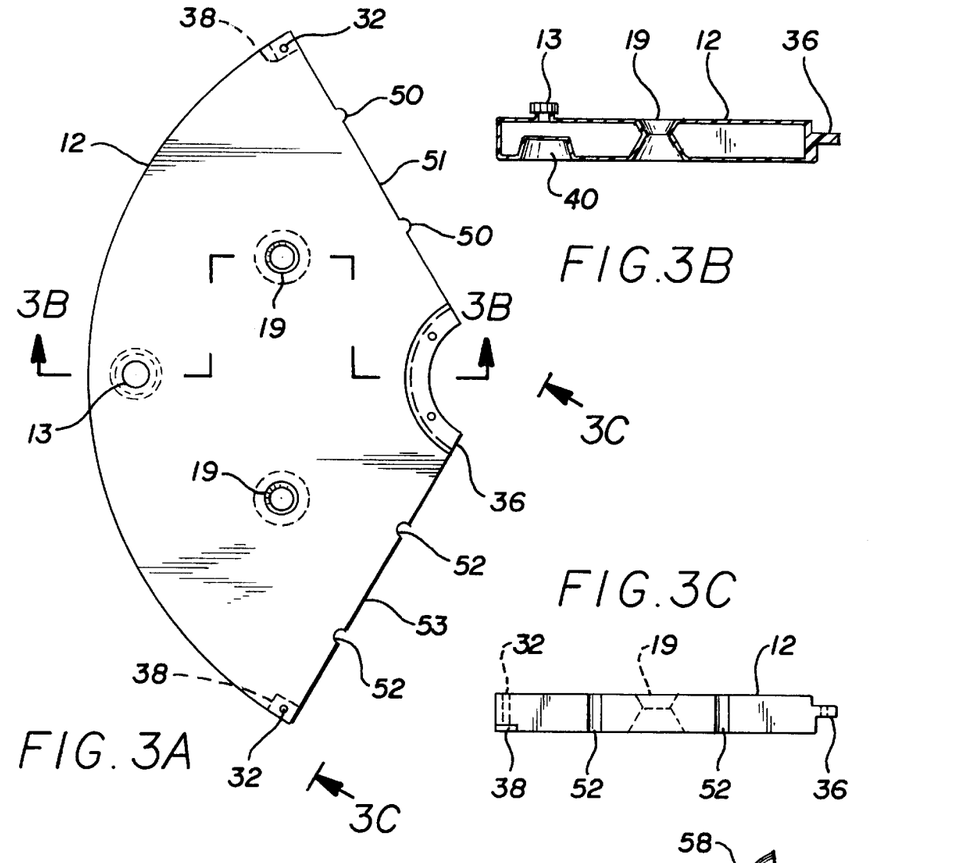
FIG. 3A is a plan view of the ballast tank of the embodiment of the present invention shown in FIG. 1.
FIG. 3B is a cross-sectional view of a ballast tank of the embodiment shown in FIG. 1 taken along line 3B—3B of FIG. 3A.
FIG. 3C is a side view of the ballast tank of the embodiment shown in FIG. 1 taken along line 3C—3C of FIG. 3A.

As seen in FIGS. 3A, 3B, and 3C, tanks 12 have a flange 36 for supporting center plate 20. Center plate 20 may be fastened to flange 36 in a number of ways, such as with screws or nuts and bolts. Tanks 12 are provided with bores 32 for receiving bolts for attaching angle brackets 24 and tank plates 25 to tanks 12. A cap 13 is provided on each tank 12 for allowing water or other liquid to be added to the tank once it is in place. When caps 13 are fastened to tanks 12 liquid is prevented from evaporating from the tanks and foreign objects are prevented from entering the tanks. It is recognized that solid substances, such as sand or metal shot may be used as the ballasting substance of the present invention. A cavity 40 is provided on the bottom of each tank 12 so that a tank may be stacked on another tank without interfering with cap 13. A pressure relief valve may also be provided on the tank for venting gas if the tank reaches a predetermined pressure.

Tanks 12 include stiffeners 19 which add rigidity to the center of the tank. Stiffeners 19 are cone-shaped indentations which project inward from the top and bottom of tanks 12.

Stiffeners 19 allow tanks 12 to withstand compressive loads, such as a workman standing on the tanks. Tanks 12 also comprise stiffening ridges 50 and grooves 52 for increasing the rigidity and stiffness of the vertical walls of tanks 12.

An important feature of tanks 12 is the ability of the tanks to mutually support each other when the support base is assembled. Walls 51 and 53 abut the walls of neighboring tanks. When support bases 10 is assembled, a synergy is created because tanks 12 support each other, prevent relative motion, and are able to withstand large loads. This design is more stable and requires less ballast and smaller tanks than if tanks 12 were not mutually supporting.

Figure 4:
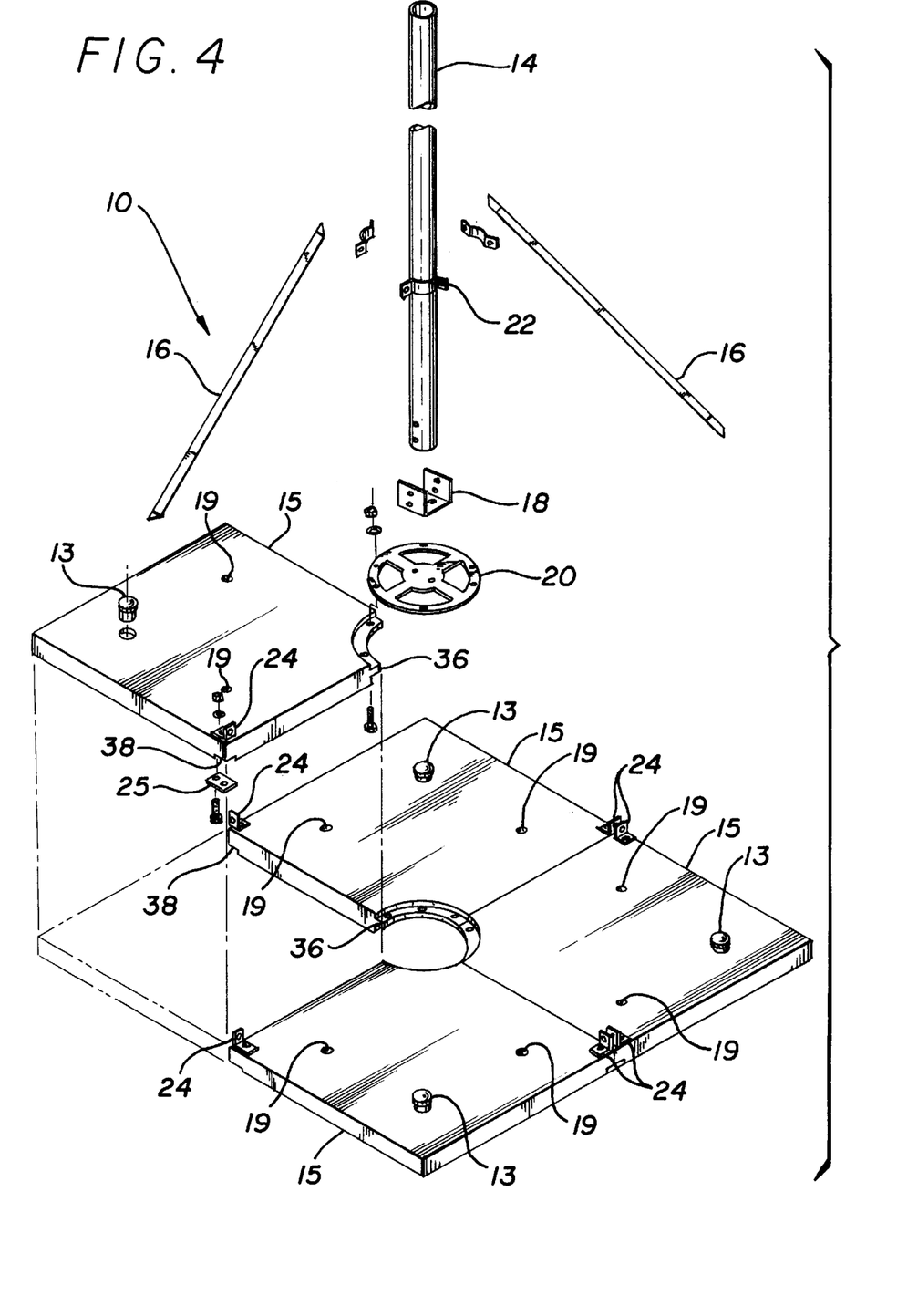
FIG. 4 is an exploded perspective view of a support base of the present invention having a square-shaped base and square-shaped ballast tanks.
Figure 5:
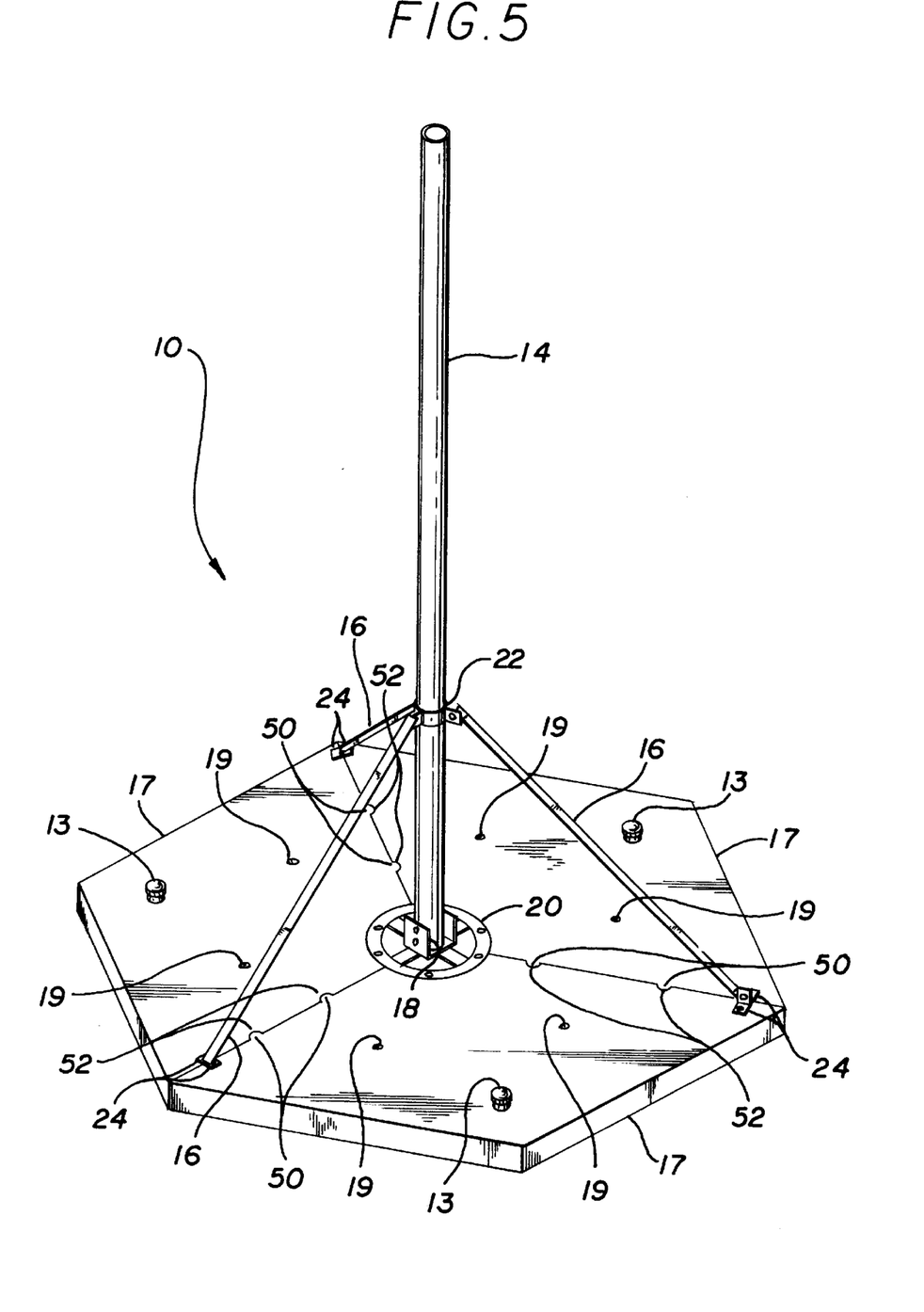
FIG. 5 is an exploded perspective view of a support base of the present invention having a hexagon-shaped base and rhombus-shaped ballast tanks.
Figure 6A:
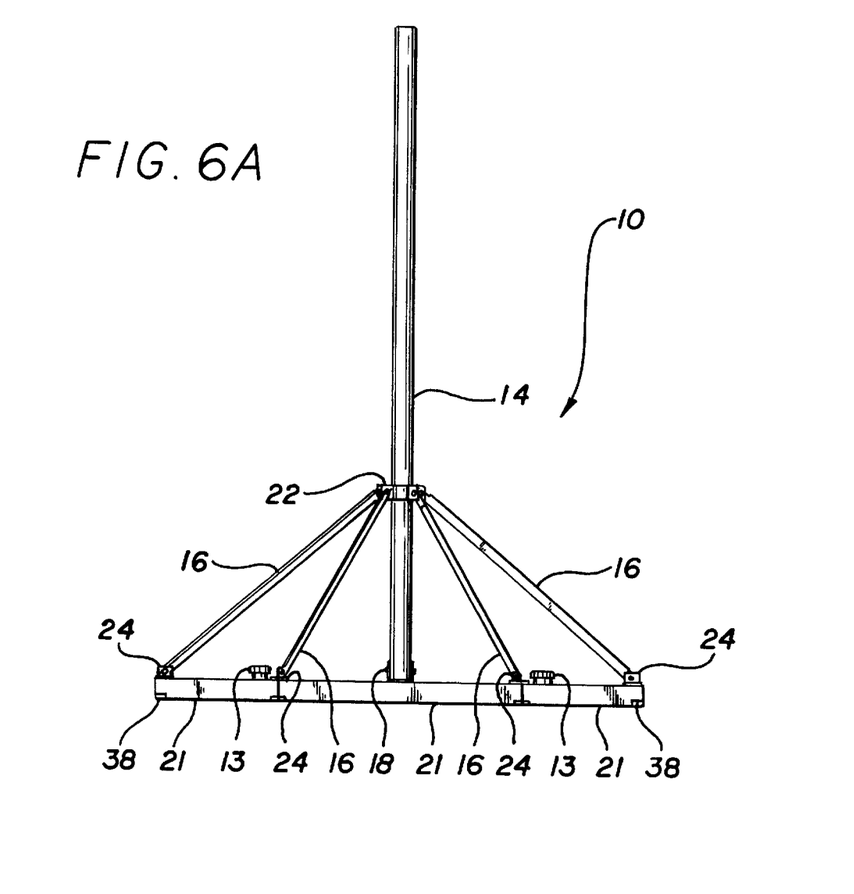
FIG. 6A is a side view of a support base of the present invention having a hexagon-shaped base and triangle-shaped ballast tanks.
Figure 6B:
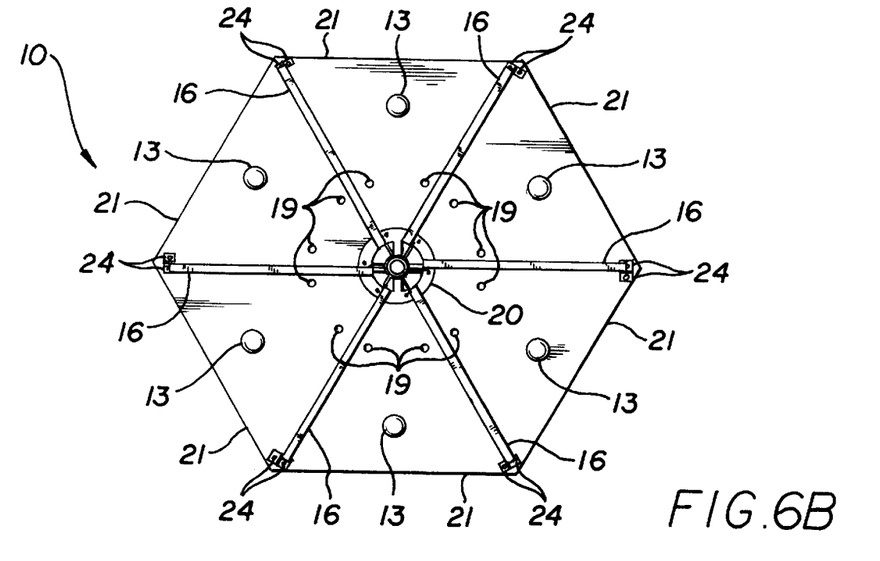
FIG. 6B is a plan view of the embodiment shown in FIG. 6A.
Figure 7A:
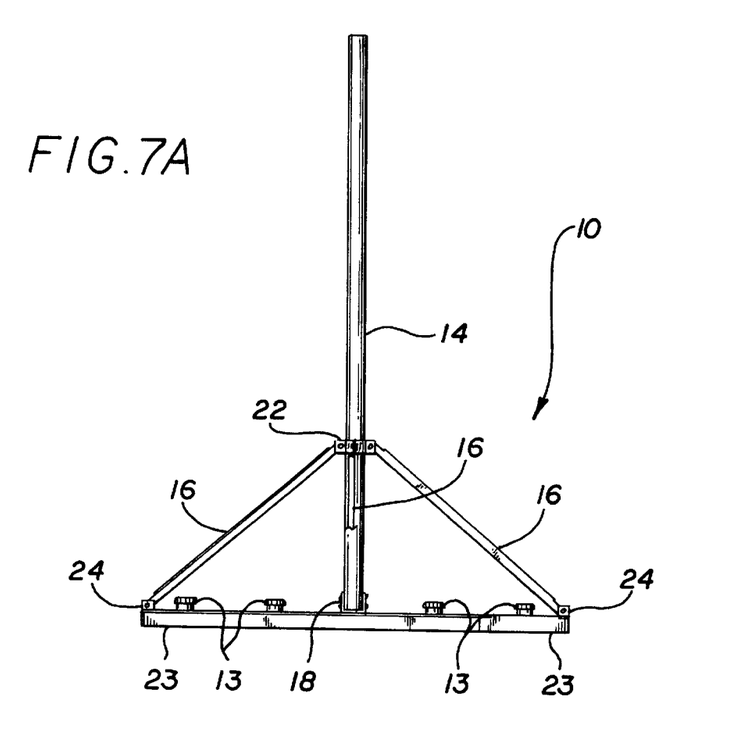
FIG. 7A is a side view of a support base of the present invention having a square-shaped base and rectangle-shaped ballast tanks.
Figure 7B:
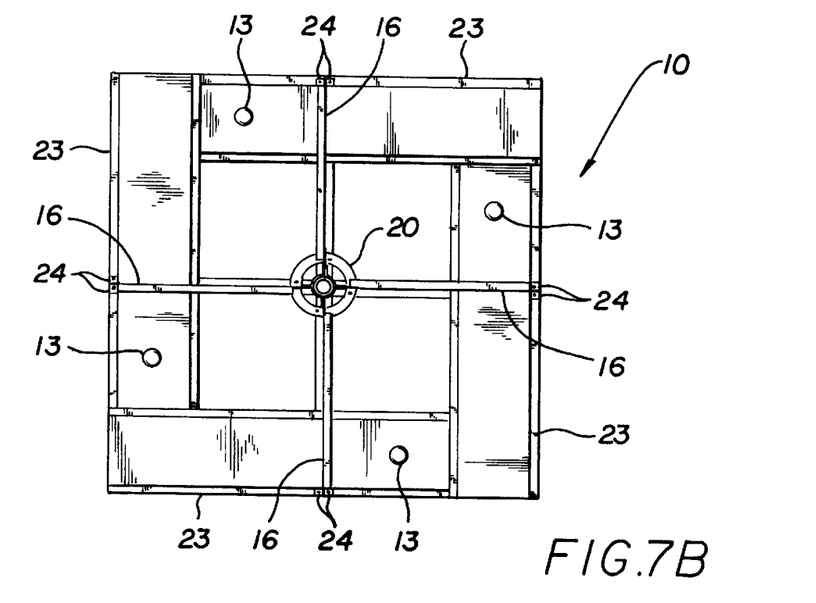
FIG. 7B is a plan view of the embodiment shown in FIG. 7A.

It is recognized that other tank shapes may be used to achieve the objects of the invention. As seen in FIG. 4, four square-shaped tanks 15 may be combined to form a square base. As seen in FIG. 5, three rhombus-shaped tanks 17 may be combined to form a hexagon base. As seen in FIGS. 6A and 6B, six triangular-shaped tanks 21 may be combined to form a hexagon. As seen in FIGS. 7A and 7B, four rectangular-shaped tanks 23 may be combined to form a square base with an open center. Different tank shapes may be used to form bases with different shapes. The tanks may also be designed so that the base fits in a particular space. When using square, triangular, or other shaped tanks, the fittings and hardware of the present invention may be adjusted to accommodate the chosen shape. However, fittings such as U-bracket 18 and center plate 20, as seen in FIGS. 1 and 2, may be used with a large variety of tank shapes.

Figures 8A, 8B:
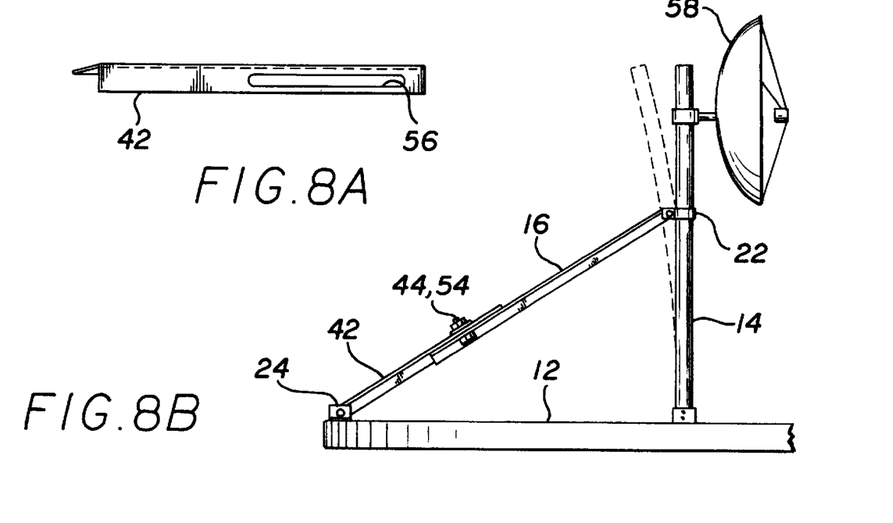
FIG. 8A is a plan view of an adjustment plate of the present invention.
FIG. 8B is a side view of the adjustment plate of the present invention in use with a support base of the present invention.

As seen in FIGS. 8A and 8B, an adjustment plate 42 may be used to adjust the angle of pole 14. Adjustment plate 42 fastens to angle brackets 24. Diagonal support 16 is fastened to pole 14 by pipe clamp 22 and fastened to adjustment plate 42 by a nut 44 and a bolt 54, which is inserted through hole 56. By loosening nut 44, bolt 54 may slide longitudinally within hole 56 and the combined length of angle support 16 and adjustment plate 42 may be changed. This changes the angular position of pole 14 relative to the assembled tanks 12 which allows pole 14 to be placed in a vertical position while support base 10 is on a sloped surface. This design also allows the angular position of an antenna 58 to be adjusted. In this embodiment, an adjustment plate 42 may be used with each diagonal support 16.

Figure 9:
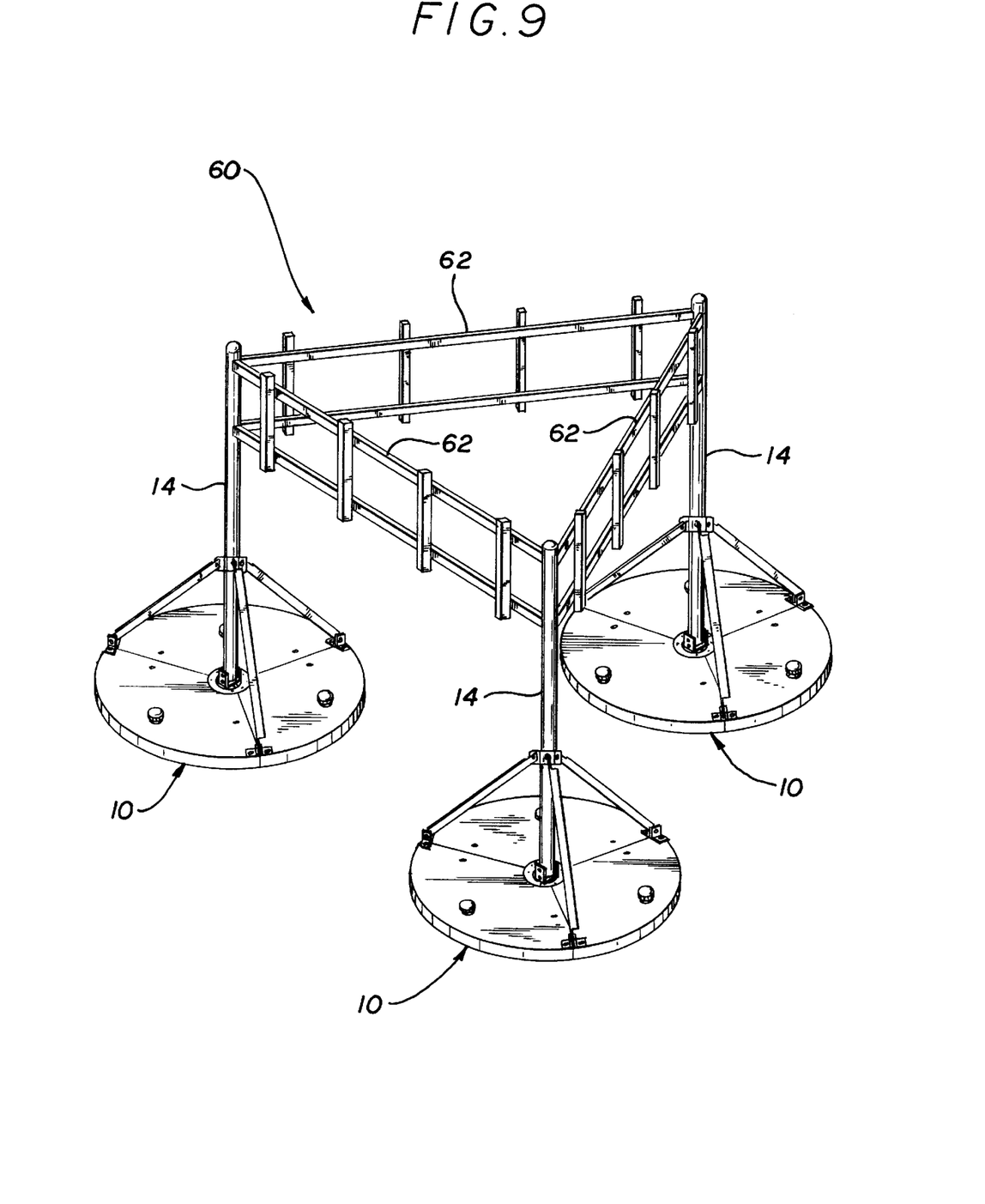
FIG. 9 is a perspective view of a combination of support bases of the present invention to form a large support structure.

As seen in FIG. 9, a plurality of support bases 10 may be combined to form a combined support base 60 for supporting a large device or combination of devices. The embodiment shown in FIG. 9 comprises trusses 62 which may be used to support an array of antennas. Trusses 62 may be attached to poles 14 by means which are well known in the art, such as nuts and bolts. Combined support bases 60 have the advantage of being more stable and having a large area upon which devices may be attached.

SUMMARY

It will be realized from the above description and drawings that the present invention provides a ballasted support base which is capable of supporting a large variety of objects, equipment, and structures. Because the support base comprises a plurality of individual tanks, the present invention may be easily transported to remote and difficult to reach sites. Each individual tank has walls which are capable of abutting and supporting neighboring tanks when the support base is assembled. The present invention includes a plurality of support bases which may be combined to support a large structure or array. An adjustment means is provided for adjusting the angular position of a support pole used in the present invention.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A liquid ballasted support base for supporting an antenna from a surface, comprising:
   (A) a plurality of similarly shaped ballast tanks, the tanks having a substantially uniform height with a constant vertical thickness when resting on the surface and being shaped to allow the tanks to be nested in an orderly collection during transportation and storage, each tank comprising:
      (a) a single-piece tank wall defining an internal cavity, the tank wall providing a substantially leak-proof barrier, wherein a liquid may be held in the internal cavity, the tank wall being adapted to support itself when the internal cavity is not full of liquid, the tank wall having at least one support portion, the support portion being adapted to abut and support a support portion of an adjacent tank when the tank is attached to the adjacent tank;
      (b) an opening in the tank wall, the opening being adapted to allow liquid to be added to the internal cavity; and
      (c) a cap removably attachable to the opening, the cap being adapted to close the opening,
      wherein the plurality of tanks may be attached together in a side-by-side relationship on the surface, wherein each tank rests on the surface and the support portions of each tank abut and support the support portion of at least one neighboring tank;
   (B) a mast attached to at least one of the tanks, the mast being adapted to support the antenna; and
   (C) a support structure attached to at least one of the tanks and to the mast, the support structure being adapted to support the mast, wherein the mast may be positioned to support the antenna above the surface and the tanks provide a stabilizing force.

2. The support base of claim 1 wherein the support structure comprises a center plate, the center plate being adapted to rest on the plurality of tanks and support the mast.

3. The support base of claim 2 wherein each tank further comprises at least one flange, the flange being adapted to support at least a portion of the center plate.

4. The support base of claim 3 wherein the flange is positioned on each tank so that the Center plate is supported in substantially the center of the support.

5. The support base of claim 1 wherein the tank wall of each tank comprises at least one stiffener, the stiffener being adapted to support the tank wall.

6. The support base of claim 5 wherein the stiffener comprises at least one cone-shaped indentation projecting inward from the tank wall.

7. The support base of claim 1 wherein each tank further comprises at least one bore in the tank wall, the bore being adapted to removably receive a bolt, wherein the bore does not penetrate the internal cavity.

8. The support base of claim 7 further comprising a tank plate, the tank plate being adapted to attach two tanks together, wherein the tank plate is attached to each tank by the bolt.

9. The support base of claim 8 wherein the tank further comprises a recess in a surface of the tank, the recess being adapted to receiving the tank plate.

10. The support base of claim 1 wherein the support structure is adjustable, wherein an angular position of the mast relative to the surface may be adjusted.

11. The support base of claim 10 wherein the support structure comprises an adjustment plate and a diagonal support, the adjustment plate being attached to at least one of the tanks and slidably attached to the diagonal support, the diagonal support being attached to the mast, wherein the angular position of the mast relative to the surface may be adjusted by adjusting the combined length of the diagonal support and the adjustment plate.

12. The support base of claim 11 wherein the diagonal support is attached to the tank in a location substantially adjacent to the support portion of the tank.

13. The support base of claim 1 wherein each of the tanks is substantially arced shaped.

14. The support base of claim 1 wherein each of the tanks is substantially square shaped.

15. The support base of claim 1 wherein each of the tanks is substantially rhombus shaped.

16. The support base of claim 1 wherein each of the tanks is substantially triangle shaped.

17. A liquid ballasted support base for supporting an antenna from a surface, comprising:

(A) a plurality of similarly shaped ballast tanks, the tanks having a substantially uniform height with a constant vertical thickness when resting on the surface and being shaped to allow the tanks to be nested in an orderly collection during transportation and storage, each tank comprising:

(a) a single-piece tank wall defining an internal cavity, the tank wall providing a substantially leak-proof barrier, wherein a liquid may be held in the internal cavity, the tank wall being adapted to support itself when the internal cavity is not full of liquid, the tank wall having at least one support portion, the support portion being adapted to abut and support a support portion of an adjacent tank when the tank is attached to the adjacent tank;

(b) an opening in the tank wall, the opening being adapted to allow liquid to be added to the internal cavity; and (c) a cap removably attachable to the opening, the cap being adapted to close the opening, wherein the plurality of tanks may be attached together in a side-by-side relationship on the surface, wherein each tank rests on the surface and the support portions of each tank abut and support the support portion of at least one neighboring tank;

(B) a mast attached to at least one of the tanks, the mast being adapted to support the antenna; and (C) an adjustable angular support structure attached to at least one of the tanks and to the mast, the support structure being adapted to support the mast in a plurality of angular positions relative to the surface, wherein the mast may be positioned to support the antenna above the surface and the tanks provide a stabilizing force.

18. A liquid ballasted support base for supporting an antenna from a surface, comprising:

(A) a plurality of similarly shaped ballast tanks, the tanks being shaped to allow the tanks to be nested in an orderly collection during transportation and storage, each tank comprising:

(a) a single-piece tank wall defining an internal cavity, the tank wall providing a substantially leak-proof barrier, wherein a liquid may be held in the internal cavity, the tank wall being adapted to support itself when the internal cavity is not full of liquid, the tank wall having at least one support portion, the support portion being adapted to abut and support a support portion of an adjacent tank when the tank is attached to the adjacent tank;

(b) an opening in the tank wall, the opening being adapted to allow liquid to be added to the internal cavity; and (c) a cap removably attachable to the opening, the cap being adapted to close the opening, wherein the plurality of tanks may be attached together in a side-by-side relationship on the surface, wherein each tank rests on the surface and the support portions of each tank abut and support the support portion of at least one neighboring tank;

(B) a mast attached to at least one of the tanks, the mast being adapted to support the antenna; and (C) an adjustable angular support structure attached to at least one of the tanks and to the mast, the support structure being adapted to support the mast in a plurality of angular positions relative to the surface, wherein the mast may be positioned to support the antenna above the surface and the tanks provide a stabilizing force.

* * * * *